(12) United States Patent
Schmidt et al.

(10) Patent No.: US 9,474,095 B2
(45) Date of Patent: Oct. 18, 2016

(54) SYSTEMS, METHODS, AND DEVICES FOR DISTRIBUTED SETUP FOR A DEVICE-TO-DEVICE SESSION

(71) Applicant: INTEL IP CORPORATION, Santa Clara, CA (US)

(72) Inventors: Andreas Schmidt, Braunschweig (DE); Maik Bienas, Braunschweig (DE); Achim Luft, Braunschweig (DE)

(73) Assignee: INTEL IP CORPORATION, Santa Clara, CA (US)

( * ) Notice: Subject to any disclaimer, the term of this patent is extended or adjusted under 35 U.S.C. 154(b) by 204 days.

(21) Appl. No.: 14/226,656

(22) Filed: Mar. 26, 2014

(65) Prior Publication Data

US 2015/0282228 A1    Oct. 1, 2015

(51) Int. Cl.
  *H04W 4/00*    (2009.01)
  *H04W 76/02*   (2009.01)
  *H04W 88/06*   (2009.01)

(52) U.S. Cl.
  CPC ........... *H04W 76/023* (2013.01); *H04W 88/06* (2013.01)

(58) Field of Classification Search
  CPC ...................... H04W 76/023; H04W 88/06
  See application file for complete search history.

(56) References Cited

U.S. PATENT DOCUMENTS

| | | | |
|---|---|---|---|
| 8,594,632 B1 | 11/2013 | Azizi et al. | |
| 2014/0010099 A1 | 1/2014 | Chiu et al. | |
| 2014/0153390 A1* | 6/2014 | Ishii | H04W 76/023 370/230 |
| 2015/0009910 A1* | 1/2015 | Ryu | H04W 72/04 370/329 |
| 2015/0230076 A1* | 8/2015 | Hedman | H04W 8/005 370/254 |
| 2015/0245393 A1* | 8/2015 | Lee | H04W 8/005 370/338 |

FOREIGN PATENT DOCUMENTS

| | | |
|---|---|---|
| WO | 2013182422 A1 | 12/2013 |
| WO | 2013191367 A1 | 12/2013 |
| WO | 2014008067 A1 | 1/2014 |

OTHER PUBLICATIONS

3GPP TR 22.803, "Technical Specification Group Services and System Aspects; Feasibility study for Proximity Services (ProSe) (Release 12)", V12.1.0, Mar. 2013, 45 pages.
PCT/US2015/017483, International Search Report and Written Opinion, May 26, 2015, 19 pages.

* cited by examiner

Primary Examiner — Keith Fang
(74) Attorney, Agent, or Firm — Stoel Rives LLP

(57) ABSTRACT

Systems, methods, and devices for distributed device-to-device (D2D) setup are disclosed herein. User equipment (UE) includes a parameter component, a standardization component, an identifier component, and a D2D session component. The parameter component is configured to determine input parameters corresponding to the UE or a user of the UE based on one or more D2D communication rules. The input parameters include a first set of input parameters having non-standardized data and a second set of input parameters having pre-standardized data. The standardization component is configured to standardize the non-standardized data of the first set of parameters to create UE standardized data. The identifier component is configured to generate a session identifier using the UE standardized data and the pre-standardized data as input in a pre-defined algorithm. The D2D session component is configured to cause the UE to communicate in a D2D cluster corresponding to the session identifier.

22 Claims, 8 Drawing Sheets

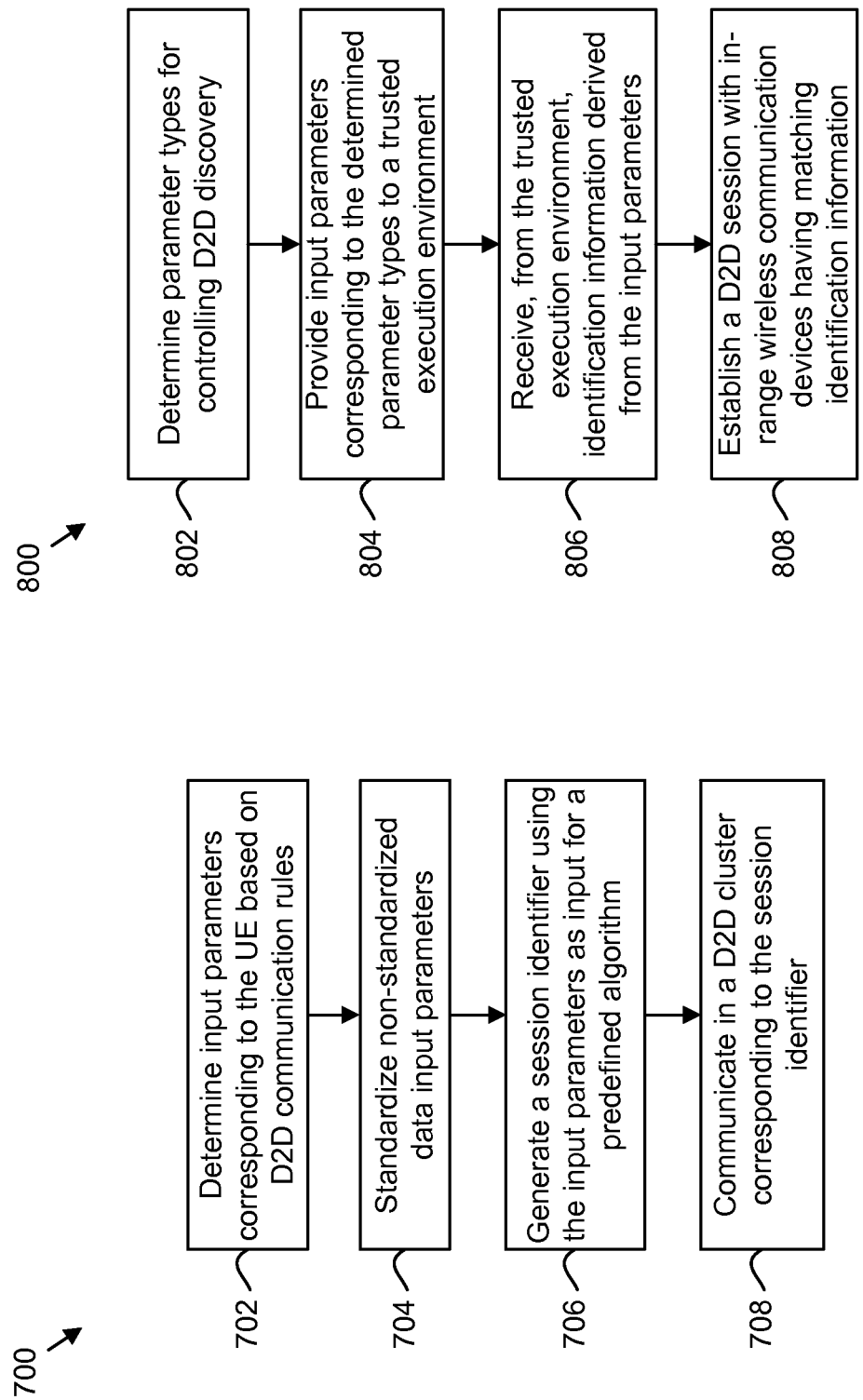

SYSTEMS, METHODS, AND DEVICES FOR DISTRIBUTED SETUP FOR A DEVICE-TO-DEVICE SESSION

TECHNICAL FIELD

The present disclosure relates to device-to-device communication and more particularly relates to setup for a device-to-device session.

BRIEF DESCRIPTION OF THE DRAWINGS

FIG. 7 is a schematic flow chart diagram illustrating a method for device-to-device (D2D) session setup consistent with embodiments disclosed herein.

FIG. 8 is a schematic flow chart diagram illustrating another method for device-to-device (D2D) session setup consistent with embodiments disclosed herein.

DETAILED DESCRIPTION OF PREFERRED EMBODIMENTS

Wireless mobile communication technology uses various standards and protocols to transmit data between a base station and a wireless communication device. Wireless communication system standards and protocols can include, for example, the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard, which is commonly known to industry groups as Wi-Fi. In a 3GPP radio access network (RAN) according to LTE, the base station is termed Evolved Universal Terrestrial Radio Access Network (E-UTRAN) Node B (also commonly denoted as evolved Node B, eNodeB, or eNB). It may communicate with a wireless communication device, known as user equipment (UE).

Figure 1:
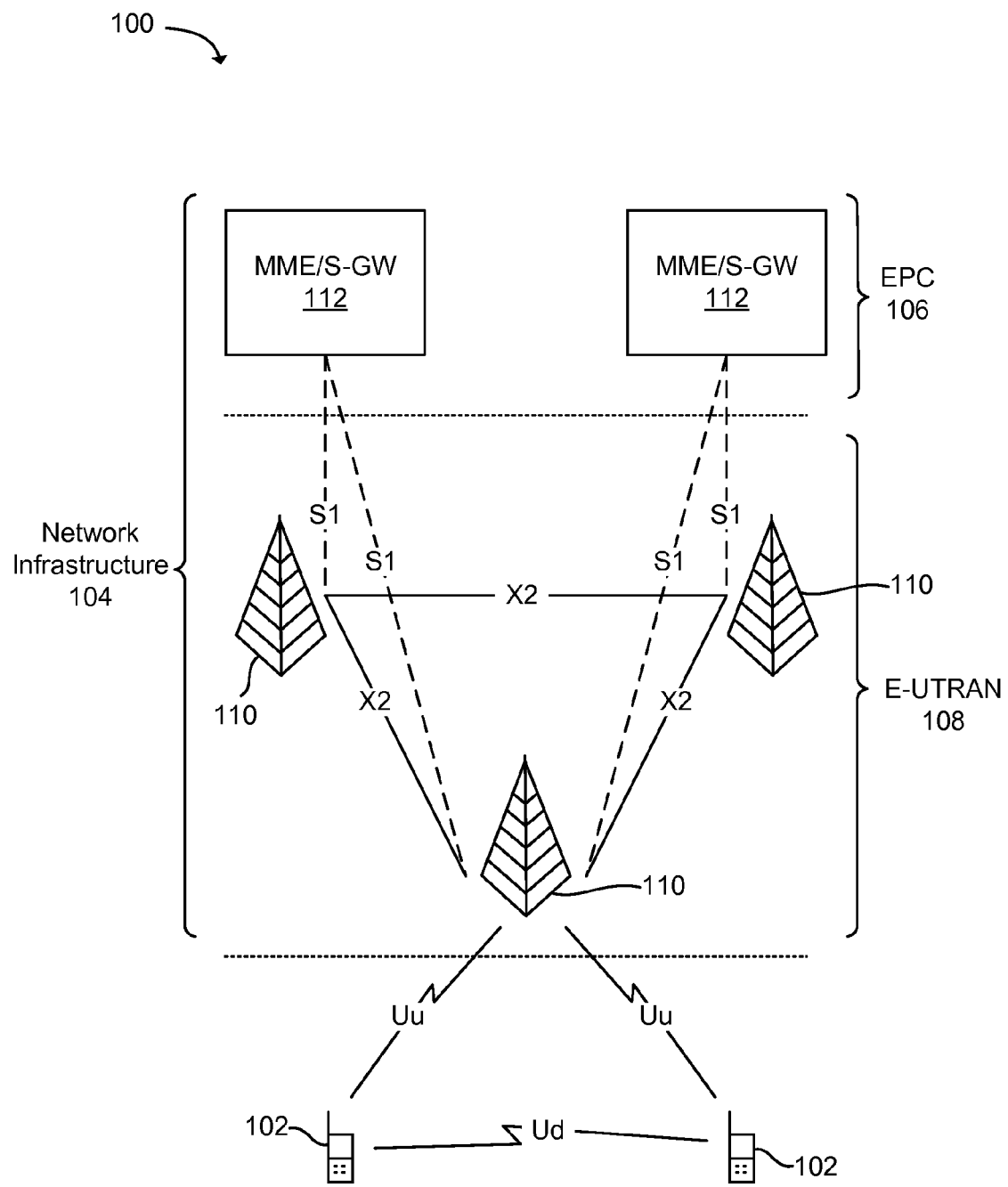
FIG. 1 is a schematic diagram illustrating a wireless communication system and environment consistent with embodiments disclosed herein.

FIG. 1 is a schematic diagram illustrating a communication system 100 that includes a plurality of UEs 102 in communication with network infrastructure 104. The network infrastructure 104 includes an evolved packet core (EPC) 106 and an E-UTRAN 108. The EPC 106 includes mobility management entities (MME) and serving gateways (S-GW) 112 that communicate with eNodeBs 110 in the E-UTRAN 108 over an S1 interface. The S1 interface as defined by 3GPP supports a many-to-many relation between EPC 106 and eNodeBs 110. For example, different operators may simultaneously operate the same eNodeB 110 (this is also known as "network sharing"). The E-UTRAN 108 is a packet switched 3GPP RAN for LTE (i.e., 3.9G) and LTE-Advanced (i.e., 4G) that was first introduced in 3GPP Release 8 and continues to evolve. In the E-UTRAN 108 the eNodeBs 110 are more intelligent than legacy Node Bs of a universal terrestrial radio access network (UTRAN) used in universal mobile telecommunication systems (UMTS or 3G). For example, almost all the RNC functionality has been moved to the eNodeB rather than being in a separate RNC. In LTE, eNodeBs 110 are interconnected with each other by means of an X2 interface that allows the eNodeBs 110 to forward or share information.

The UEs 102 are in communication with an eNodeB 110 using a Uu air interface using a licensed cellular spectrum. The UEs 102 and eNodeB 110 may communicate control data and/or user data with each other. A downlink (DL) transmission in an LTE network can be defined as a communication from the eNodeB 110 to the UE 102, and an uplink (UL) transmission can be defined as a communication from the UE 102 to the eNodeB 110.

In addition to DL and UL transmissions over the Uu interface, the UEs 102 are also shown communicating directly with each other over a Ud air interface. 3GPP has recently studied use cases and identified requirements for operator controlled discovery of and communication between mobile devices that are in close proximity. This activity is commonly known as proximity services (ProSe) or device-to-device (D2D) communication. First results of this study can be found in "Feasibility Study for Proximity Services (ProSe)," 3GPP TR 22.803 v12.1.0 (March 2013). Various applications and use cases proposed in 3GPP may involve network initiated or UE initiated communication to or among a group of users and/or devices. In D2D, a UE 102 is able to communicate directly with another UE 102 without routing communications via an eNodeB 110 or the core network (e.g. EPC 106), as illustrated by the Ud D2D interface in FIG. 1. D2D has been proposed for local social networks, content sharing, location based marketing, service advertisements, mobile to mobile applications, public safety, etc. D2D communications are of interest due to their ability to reduce load on a core network (such as the EPC 106) or a radio access network (such as the E-UTRAN 108), increase data rates due to direct and short communication paths, provide public safety communication paths, and provide other functionality.

There are in principle various alternatives to realize such a direct communication path between mobile devices. In one embodiment, the D2D air interface Ud could be realized by some type of short range technology, such as Bluetooth or Wi-Fi, or by reusing licensed LTE spectrum, such as a UL spectrum. Although either time division duplex (TDD) or frequency division duplex (FDD) technology may be used for the Ud interface, the present disclosure will focus on TDD technology. TDD has many benefits over FDD for D2D communications. For example, the same channel characteristics for the transmission path and reception path can be anticipated, and channel estimation using closed loop principles is not needed.

D2D communications can be generally divided into two parts. The first part is proximity detection (or device discovery) where UEs 102 are able to determine that they are within range for D2D communication. Proximity detection may be assisted by network infrastructure 104, may be performed at least partially by the UEs 102, or may be performed largely independent of the network infrastructure 104. The second part is direct communication, or D2D communication, between UEs 102, which includes a process to establish a D2D session between UEs 102 as well as the actual communication of user or application data. D2D communication may or may not be under continuous control of a mobile network operator (MNO). For example, the UEs 102 may not need to have an active connection with an eNodeB 110 in order to take part in D2D communications. As used herein the phrase D2D session setup may be used to reference discovery, session establishment, or establishing parameters, keys, codes, identifiers, or the like to be used in D2D communication.

A basic problem in establishing D2D sessions is how to determine what associations or groupings will be allowed or created between UEs 102. For example, what rules should UEs 102 or networks follow to determine whether UEs 102 that are in range of each other should establish D2D communication or belong to a same D2D group or cluster. Example questions that need to be answered by these rules include what D2D groups are currently present at a given time and location, and which of these D2D groups is a given UE allowed to join?

One method is to have an MNO disseminate D2D group information over the air (for example, using the Uu interface as part of the cellular communication system's broadcasting capabilities). However, such a method would have certain drawbacks, such as the additional load it would cause on the Uu air interface, and the spatial and temporal granularity of the broadcast information. For example, due to very high mobility of UEs 102, the information provided by the MNO may not be up-to-date. Additionally, this type of dissemination would likely be a centralized approach that is fully under the control of the MNO. This may result in only allowing UEs 102 assigned or subscribed to the same MNO to receive relevant D2D group information.

Based on the foregoing, applicants have recognized a need for a distributed approach for obtaining D2D group information and D2D session establishment. The present disclosure provides a distributed approach for the generation of unique session identifier(s) in UEs 102 or other mobile devices for D2D communication. Such a D2D session identifier can represent, or can be utilized to derive, D2D group IDs, D2D encryption keys, D2D resource allocation patterns, or other information needed for D2D communications.

According to one embodiment, a UE 102 may include a parameter component, a standardization component, an identifier component, and a D2D session component. The parameter component is to determine input parameters corresponding to the UE 102 or a user of the UE 102 based on one or more D2D communication rules. The input parameters may include a first set of input parameters having non-standardized data and a second set of input parameters having pre-standardized data. The standardization component is configured to standardize the non-standardized data of the first set of parameters to create UE standardized data. For example, the standardization component may be configured to convert data in a first format to a second format. In one embodiment the standardization component 204 may be understood as a quantization component. The identifier component is configured to generate a session identifier using the UE standardized data and the pre-standardized data as inputs in a predefined algorithm. The D2D session component is configured to cause the UE to communicate in a D2D cluster corresponding to the session identifier.

By way of example, a first set and a second set of input parameters can be used by a UE 102 to calculate the desired D2D session identifier. The first set of input parameters may consist of information that needs to be standardized or quantized, such as date, time, and location coordinates, while the second set of input parameters may consist of information that can be fed into the calculation algorithms right away without standardizing or quantizing, such as information read from a ticket to an event, or various auxiliary identifiers. These various auxiliary identifiers may include any identifiers that are standardized in a predetermine format such as identifiers for an organizer of an event, a service provider, a device manufacturer, a software developer, a certain application being currently used or installed on the mobile device, or the like. In one embodiment of the present invention, a ticket to an event may also be an electronic ticket stored somewhere in the mobile device. In another embodiment of the present invention, the validity of a calculated D2D session identifier (or D2D related information derived from a D2D session identifier) is restricted to a certain location or duration.

This embodiment is given by way of example only. Further details and example embodiments will be discussed below.

Figure 2:
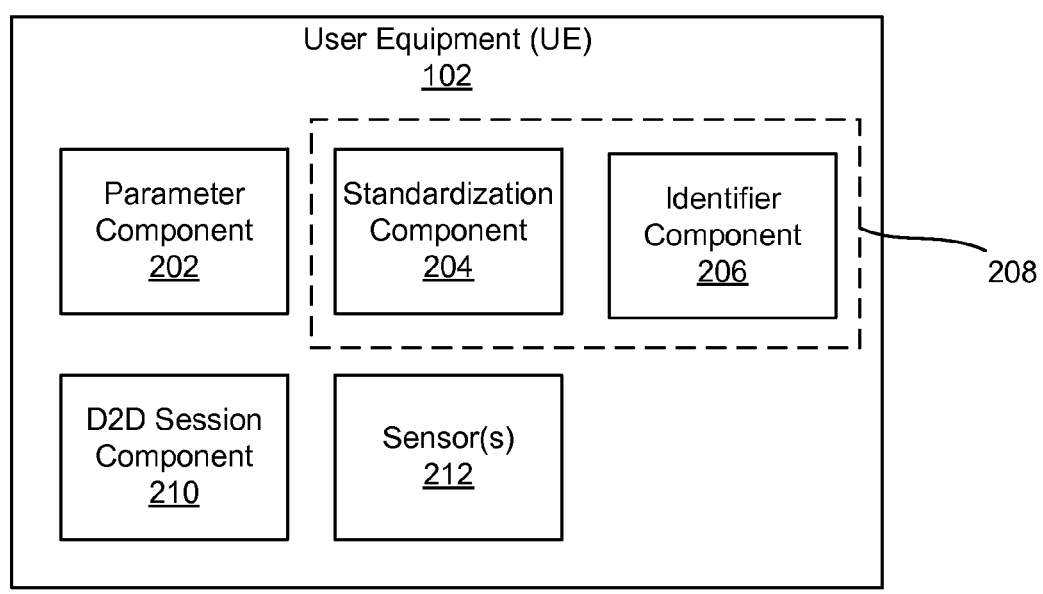
FIG. 2 is a schematic block diagram illustrating components of user equipment (UE) consistent with embodiments disclosed herein.

FIG. 2 is a schematic block diagram illustrating example components of a UE 102 for distributed D2D session setup. The UE 102 includes a parameter component 202, a standardization component 204, an identifier component 206, a trusted execution environment 208, a D2D session component 210, and sensors 212. The components 202-212 are given by way of example only and may not be included in all embodiments. For example, other embodiments may include only one or any combination of two or more of the depicted components 202-212. Furthermore, one of skill in the art will recognize that the components 202-212 may be included in any type of mobile station and are not restricted to inclusion in UE 102 or for communication with 3GPP networks.

The parameter component 202 is configured to determine input parameters for controlling D2D discovery or communication. In one embodiment, the parameter component 202 is configured to determine input parameters that will be used to control generation of a session identifier or key. The session identifier may include numerical, alphanumerical, or other information that may be used in relation to D2D communication. For example, the session identifier or key may be used as, or used to determine, a group identifier, encryption key, resource allocation, or the like. In one embodiment, the session identifier may be determined at a parent UE 102 (e.g., the UE of FIG. 2) and may be used during discovery in order to locate in-range UEs 102 that are allowed to join the same D2D group.

In one embodiment, the parameter component 202 determines the input parameters based on one or more communication rules. The communication rules may include rules that correspond to a communication standard or that are configured during usage. In one embodiment, the communication rules may include communication rules defined by an MNO. For example, the MNO may provide D2D rules based on current density or other information about a communication environment, hardware, or software of the UE 102. In one embodiment, the communication rules may include communication rules defined by an application layer program executed by the UE 102. For example, the application layer program may include a social network application or other application that seeks to share data with nearby, or in-range, UEs 102. In one embodiment, the communication rules may be at least partially defined by a user of the UE 102. In one embodiment, the rules indicate what parameter types must have matching values between UEs 102 in order to allow D2D communication. In one embodiment, the communication rules may indicate a validity period for the communication rules or for the parameters indicated by the communication rules. For example, the validity period may be a period during which UEs 102 having the indicated matching parameter inputs can be part of the same D2D group.

In one embodiment, the parameter component 202 may obtain input parameters by obtaining data corresponding to an input type indicated by one or more communication rules. The parameter component 202 may determine the input parameters by obtaining information from memory or from one or more sensors. For example, some information may be stored locally on the UE 102, such as identifiers for service providers, software, hardware, manufacturers, user accounts, or any other information. For example, some information stored locally on the UE 102 may be of more private or personal nature and may be pertaining to a user's browsing history, bookmarks stored for browsing the Internet, address book entries, calendar appointments, or similar information. In one embodiment, the parameter component 202 may obtain information from the sensors 212 of the UE 102. Example sensors may include microphones, optical sensors such as cameras or light sensors, accelerometers, positioning or navigation systems or receivers, or other sensors. In one embodiment, processing or calculation of data may be needed in order to get the desired input parameters or values.

In one embodiment, the parameter component 202 obtains at least a portion of the input parameters from one or more sensors 212. In one embodiment, the sensors 212 include a microphone, and the input parameters include audio data gathered by the microphone. For example, the microphone may gather data in an audio environment of the UE 102. The data may include audio from a speaker at an event such as a concert or football game, and may be used to determine that UEs 102 are within range of each other or are at the same event. In one embodiment, the sensors 212 include a camera, and the input parameters include information from a barcode captured by the camera. For example, a camera may be used to capture an image of a ticket for an event, and information from a barcode on the ticket may be used as an input parameter. In one embodiment, the sensors 212 include a navigation satellite system receiver, and the input parameters include location information determined by the navigation satellite system receiver. For example, the navigation satellite system receiver may include a global positioning system (GPS) receiver, a global navigation satellite system (GLONASS) receiver, a BeiDou navigation satellite system (BDS) receiver, or the like, and the input parameters may include location data determined or received by the navigation satellite system receiver.

The input parameters may include data that needs to be standardized or data that has already been standardized. For example, standardized data may include data that does not need to be modified after it is obtained. Examples of data that may not need to be modified include identifiers such as a manufacturer identifier or software identifier that has been standardized and is most likely to be standardized in the same way at other UEs 102 or devices. This standardized data will be, or has a high likelihood of being, in the same format, such that the identifier will be the same regardless of on which device it is found. Further examples of standardized data include service provider identifier, a device manufacturer identifier, an event organizer identifier, a software developer identifier, an application identifier, and ticket information. Standardized data that has been standardized prior to determination by the parameter component 202 may also be referred to herein as normalized, quantized, or pre-standardized data.

Non-standardized data may include data that needs to be standardized to properly determine a session identifier. For example, some input parameter values of the same parameter type may be formatted differently, may have a different level of accuracy, or may only need to fall within a desired range. This data may be standardized to ensure that values that vary in format, in accuracy, or within a prescribed range are converted to uniform standardized data. Examples of data that may need to be standardized include a date, a time, a location, audio data, optical data, velocity data, acceleration information, or the like. Such data may be referred to herein as non-standardized, unstandardized, non-uniform, non-normalized, or the like.

In one embodiment, the parameter component 202 determines or obtains input parameters that include both standardized and non-standardized data. Because of the wide range of parameter types that may be included as input parameters, there may be some need to define how specific parameter types should be standardized. In one embodiment, in addition to obtaining or determining input parameters, the parameter component 202 may determine standardization rules for standardization of one or more of the input parameters. The standardization rules may include rules received from an application layer program or other software executed by the UE, an MNO, or the like. Standardization rules may indicate what information to extract, parse, concatenate, omit, and/or modify in order to place data in a standardized format. For example, the standardization rules may indicate a decimal point of accuracy or a range for the input parameter. The standardization rules may indicate parameter types and/or input parameters to which the rules should be applied. Further examples of standardization for different input parameters are provided below.

Although various input sensors of the mobile device (e.g., camera, microphone, etc.) could be used to determine at least one of the required input parameters, it may be necessary to standardize the information to remove error or account for variations in how the information is received or processed due to different locations, hardware characteristics, software, or the like. For example, it might be beneficial in some situations to let a microphone detect the speaker in a stadium during a football game or the background music in a theater before the play starts, but these are likely to be at least slightly different. In general, standardizing or quantizing operations that are performed on input parameters for the calculation of D2D session identifiers help enlarge a group of D2D users by allowing similar values for input parameters. For example, audio data may be processed to create simplified and/or standardized representations of the data that are more likely to match up with audio data at other UEs 102 that has been processed in the same way.

In one embodiment, the parameter component 202 may provide the determined and/or obtained input parameters to one or more of the other components. For example, the parameter component 202 may provide the standardization rules and/or at least a portion of the input parameters to the standardization component 204, the identifier component 206, and/or the trusted execution environment 208.

The standardization component 204 is configured to standardize one or more input parameters. For example, the standardization component 204 may modify or reformat the input parameters to place the input parameters in a standardized format. In one embodiment, the standardization component 204 may receive non-standardized data and one or more standardization rules and create UE standardized data. For example, the standardization component 204 may receive the non-standardized data and standardization rules while pre-standardized data is provided to the identifier component 206. Non-standardized data that has been standardized by the standardization component 204 may be referred to herein as UE standardized data, post-standardized data, standardization component standardized data, or the like. Examples of data standardization will be provided in relation to example scenarios below.

The identifier component 206 is configured to generate a session identifier using the input parameters. In one embodiment, the identifier component 206 receives a first set of input parameters that include pre-standardized data from the parameter component 202 and a second set of input parameters that include UE standardized data from the standardization component 204. These input parameters are then used as inputs in a predefined algorithm that generates the session identifier. The session identifier may include a key (e.g., an encryption key), a code (e.g., an access code), a name or any other data that may be used by a UE 102 in D2D grouping and/or communication (or, generally speaking, during the phase of D2D session setup). The predefined algorithm includes an algorithm that is known to a plurality of other UEs 102 or devices, such that other UEs 102 are able to get the same session identifier if they have the same or roughly the same input parameters.

The algorithm may include a variety of types of algorithms that provide the same output based on the same input. In one embodiment, the algorithm may create a session identifier that makes it difficult to reverse engineer the original input parameters. Example algorithms may include algorithms for cryptographic hash functions, random number generators, or other algorithms that can take input parameters and calculate a unique code or key, or other information. In one embodiment, the algorithm is restricted to a certain size session identifier as an output, to provide uniformity among different UEs 102. In one embodiment, the algorithm may only be known within trusted execution environments 208 such that unauthorized calculations of session identifiers may not be performed. For example, this may help ensure that only those with the same input parameters, as defined by D2D communication rules, are able to communicate in a D2D group.

In one embodiment, identifier component 206 may return the session identifier (or any derivative(s) thereof, such as group identifier(s), encryption key(s), access code(s), resource allocation pattern(s), and so on) to the D2D session component 210 or another component of the UE 102 for use in D2D communication.

In one embodiment, the standardization component 204 and/or the identifier component 206 are included in the trusted execution environment 208. For example, the standardization component 204 and/or the identifier component 206 may perform their operations within a protected environment to ensure that standardization and/or session identifier generation is performed in accordance with indicated algorithms and rules. Inclusion within the trusted execution environment 208 may allow for a degree of trust that UEs 102 with the same session identifiers have sufficiently matching input parameters. This may increase security with regard to D2D communications. As discussed above, the degree of matching of the input parameters may be based on standardization rules that may account for ranges, errors, or varying data formats.

Figure 3:
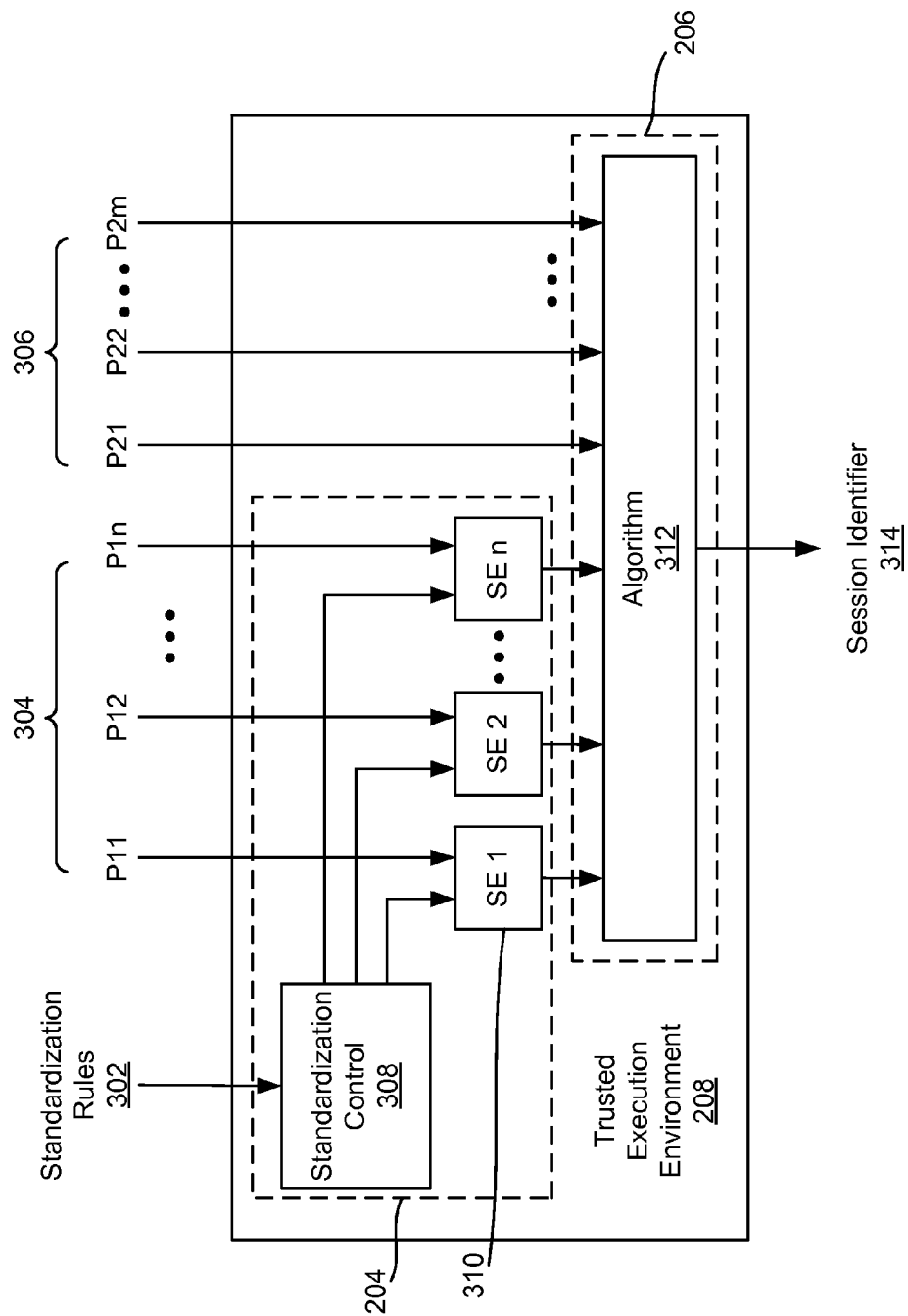
FIG. 3 is a schematic diagram illustrating generation of a session identifier consistent with embodiments disclosed herein.

FIG. 3 is a schematic diagram illustrating example inputs and processing of inputs within a trusted execution environment 208 to output a session identifier. Standardization rules 302, a first set 304 of input parameters, and a second set 306 of input parameters are shown as inputs into the trusted execution environment 208. Although the inputs 302, 304, and 306 are shown in parallel, it will be understood that the inputs 302, 304, and 306 may be provided in series through one or more communication channels or ports to the trusted execution environment 208. The standardization rules 302 may include rules on how to standardize non-standardized data in the first set 304 of input parameters, as discussed above. The first set 304 of input parameters includes non-standardized input parameters P11, P12, up to P1n, where there are n non-standardized input parameters in the first set 304. The standardization rules 302 are provided to a standardization control 308, and the input parameters P11, P12, up to P1n are provided to corresponding standardization engines 310, which include SE 1, SE 2, up to SE n, wherein there are n standardization engines for n corresponding input parameters in the first set 304. In one embodiment, a single standardization engine may be used to standardize two or more input parameters. The standardization control 308 and the standardization engines 310 are part of the standardization component 204. The standardization control 308 controls the standardization engines 310 based on the standardization rules 302 to provide post-standardized, or UE standardized, data to the identifier component 206.

The second set 306 of input parameters and the first set 304 of input parameters, as standardized by the standardization component 204, are provided to the identifier component 206 as inputs for an algorithm 312 to generate a session identifier 314. The second set 306 of input parameters includes standardized input parameters P21, P22, up to P2m, where there are m standardized input parameters in the second set 306. As discussed above, the algorithm 312 may include a predefined algorithm and/or an algorithm known to other trusted execution environments in other UEs 102. Thus, the session identifier 314 may be the same for any other UE 102 that has the same input parameters as provided in the first set 304 and second set 306 of input parameters. The generated session identifier 314, which may also be referred to as a key or code, may be returned to a parent UE 102 or other mobile station.

In another embodiment, the session identifier 314 is utilized to derive a group identifier, an encryption key, an access code, or a resource allocation pattern for use in D2D communication.

The trusted execution environment 208 may provide a secure environment in which proper and/or secure implementation of input parameter standardization and session identifier generation may be ensured. Example trusted execution environments 208 are available in smart card or integrated formats for use in a UE 102 or other mobile station. For example, the trusted execution environment 208 may include one or more of a subscriber identity module (SIM) card and a universal integrated circuit card (UICC) that can be inserted into and/or removed from a slot in a UE 102. As another example, the trusted execution environment 208 may include an integrated trusted platform module (TPM) that cannot be removed, or is difficult to remove, from a UE 102 without damaging the UE 102, TPM, or data within the UE 102 or TPM. In one embodiment, the standardization component 204 and/or identifier component 206 may include code stored and/or executed within a trusted execution environment 208. Other trusted execution environments 208 are contemplated within the scope of the present disclosure, including trusted execution environments 208 created through software and/or encryption on a UE 102 or mobile station.

Further background on example trusted execution environments may be helpful with respect to TPMs and smart cards. A TPM is an integrated circuit module that has been developed as part of the Trusted Computing Group (TCG), formerly known as TCPA, in order to provide a secure environment for personal computers (PCs). It resembles a smart card inseparably mounted on a computation platform. The difference is that it is coupled to a system (computation platform) rather than to a user. Other deployment scenarios—apart from PCs—are personal digital assistants (PDAs), cellular phones (such as smartphones), and consumer electronics. A TPM chip is a passive element. It cannot actively influence either the bootstrapping process of the system or any ongoing operation. But it holds a unique identification tag that can be used to identify a system (computation platform) unambiguously. Furthermore, a TPM can generate, use, and store a number of different keys (e.g., for encryption algorithms or digital signatures).

One benefit of a TPM is that these keys need not be used outside the TPM. In other words, all computations are done within the trusted domain of the TPM instead. Software attacks are therefore deemed impossible. Also, protection from hardware attacks is relatively good (similar to secure smart cards). TPMs are manufactured in such a way that physical attacks result in the destruction of all data. A computation platform with integrated TPM can prove its trustworthiness to a remote entity. In many cases, having the operational state of a system (computation platform) successfully verified by a TPM's control function is a precondition to executing software or running certain applications. For example, in the present disclosure, the TPM may be preconditioned to perform standardization control 308 and the algorithm 312.

Smart cards may be used in a similar manner except that they are physically removable from a slot within a UE 102 or other mobile station. With regard to smart cards, mobile phones operating according to the global systems for mobile communications (GSM) standard require a SIM card for usage in the mobile network, whereas mobile phones operating according to the UMTS standard require a UICC with at least one universal subscriber identity module (USIM). Both types of cards (SIM card and UICC) offer storage capability for applications and application data in their application memory. Most of these applications are mobile communication specific and thus are issued, maintained, and updated by the MNO. Trustworthy applications, such as applications corresponding to the standardization component 204 and identifier component 206, may also be stored in the application memory of a smart card.

Figure 4:
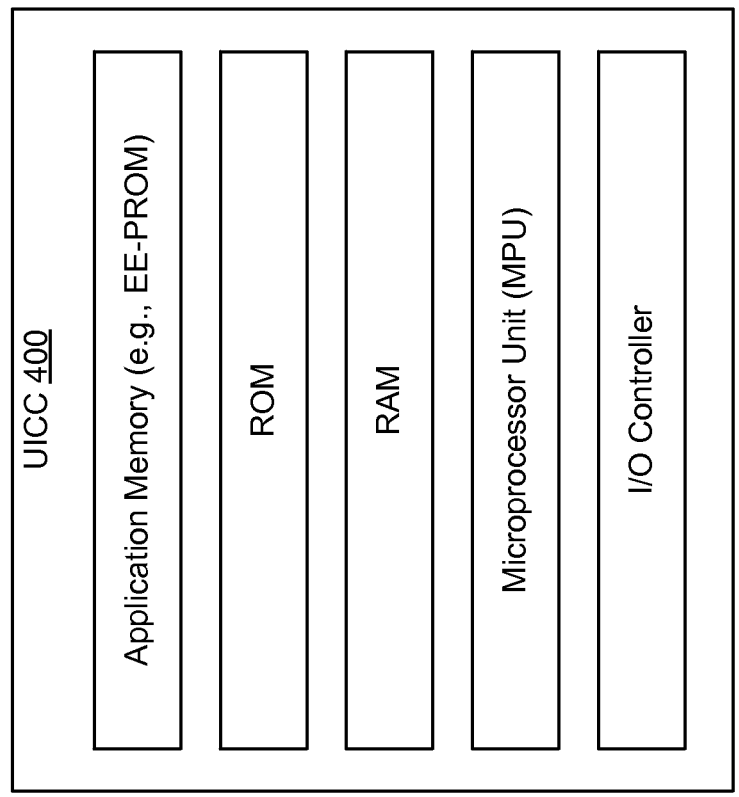
FIG. 4 is a schematic block diagram illustrating one embodiment of a trusted execution environment consistent with embodiments disclosed herein.

FIG. 4 illustrates example components of a UICC 400 as one example embodiment of a smart card that may be used as a trusted execution environment 208. A few of the important elements of a smart card are shown, including an application memory, a read-only memory (ROM), a random-access memory (RAM), a microprocessor unit (MPU), and an input/output (I/O) controller. The application memory, which may include an electrically erasable programmable ROM (EE-PROM), may be used to store applications, universal SIM application toolkit (USAT) applets, and data. For example, the data may include short message service (SMS) messages, multimedia messaging service (MMS) messages, a phone book, or other data. The ROM may include the USAT, smart card applications (such as a USIM or an internet protocol (IP) multimedia services identity module (ISIM)), a file system, algorithms, a Java virtual machine, an operating system, and/or the like. The RAM may be used as working memory and may be used for storage of results from calculations and/or as memory for I/O communications. The MPU may be used to execute instructions, such as those in the application memory, ROM, and RAM. The I/O controller may manage data flow between the MPU and a UE 102 or mobile equipment (ME).

In a mobile communication system operating according to the GSM standard, the SIM card and the ME together form a mobile station, whereas in a mobile communication system operating according to the UMTS standard, the UICC (in the ROM of which multiple SIM and USIM may reside) and the ME together form a UE.

Returning to FIG. 2, the D2D session component 210 is configured to cause the UE 102 to communicate in a D2D group corresponding to the session identifier 314. For example, the UE 102 may receive the session identifier 314 or other identification information from the identifier component 206 and use the session identifier 314 during D2D communication. In one embodiment, the D2D session component 210 generates a group identifier based on the session identifier 314 and establishes or joins a D2D group that uses the group identifier. In one embodiment, the D2D session component 210 generates an encryption key based on the session identifier 314 and uses the encryption key to encrypt signals sent to other UEs 102 in a D2D group or cluster. In one embodiment, the D2D session component 210 may use the session identifier 314 as the group identifier, encryption key, or the like. In one embodiment, the D2D session component 210 allocates resources based on the session identifier 314. For example, the D2D session component 210 may establish a frequency hopping sequence based on the session identifier 314.

Scenarios

Examples of distributed D2D setup will be illustrated in relation to the following scenarios.

In scenario 1, three UEs 102 (UE 1, UE 2, and UE 3) independently generate session identifiers based on location and device manufacturer data. For example, an MNO, application, user, or other entity or program may indicate that D2D communication or discovery should be based on location and device manufacturer. For UEs 102 with matching locations and device manufacturers, the same session identifier will be generated. More specifically, one or more UEs 102 use device manufacturer information that does not require standardization and location information that does require standardization to determine a session identifier. In this scenario, the same session identifier is available at the end of the calculation process for every UE 102, or other mobile device, that is in the same geographical region (as defined by standardization rules) and was assembled by the same device manufacturer (also, as defined by standardization rules, if needed).

With regard to processing the device manufacturer, a parameter component 202 of each UE 102 reads a manufacturer identifier from memory, such as internal UE 102 memory. In one embodiment, the manufacturer identifier may be read from secure, or encrypted, memory. Table 1 below illustrates manufacturer identifiers for each of the three UEs 102. The manufacturer identifier is a standardized value and thus no standardization is needed. Two of the manufacturer identifiers are identical. Specifically, UE 1 and UE 3 share the same manufacturer identifier, and UE 2 has a different one. Each of these identifiers is fed into the algorithm, as illustrated in FIG. 3. In one embodiment, the manufacturer identifier may be derived from the international mobile station equipment identity (IMEI) of each UE 102. This would require parsing of the IMEI into subcomponents to generate the manufacturer identifier. The rules for parsing could be included as standardization rules, and the IMEI would be standardized before being fed into the algorithm.

TABLE 1

| | Device Manufacturer Identifier | Comparison |
|---|---|---|
| UE 1 | 105 642 228 016 | Same as UE 3 |
| UE 2 | 105 621 743 323 | Different |
| UE 3 | 105 642 228 016 | Same as UE 1 |

With regard to location, location information may be expressed in terms of latitude and longitude. Latitude (which may be abbreviated as Lat, ϕ, or phi) is the angle between the equatorial plane and a line that is normal to the reference ellipsoid, which approximates the shape of Earth to account for flattening of the poles and bulging of the equator. Lines joining points of the same latitude are called parallels, which trace concentric circles on the surface of the Earth, parallel to the equator. The north pole is 90° N; the south pole is 90° S. The 0° parallel of latitude is designated the equator, the fundamental plane of all geographic coordinate systems. The equator divides the globe into northern and southern hemispheres.

Longitude (which may be abbreviated as Long, λ, or lambda) is the angle east or west of a reference meridian between the two geographical poles to another meridian that passes through an arbitrary point. All meridians are halves of great circles, and are not parallel. They converge at the north and south poles. A line passing to the rear of the Royal Observatory, Greenwich (near London in the United Kingdom) has been chosen as the international zero-longitude reference line, the Prime Meridian. Places to the east are in the eastern hemisphere, and places to the west are in the western hemisphere. The antipodal meridian of Greenwich is both 180° W and 180° E.

TABLE 2

| | Latitude | Longitude |
|---|---|---|
| Decimal | 52.264667 North | 10.523776 East |
| Degree-Minute-Second | 52° 15' 52.80" North | 10° 31' 25.59" East |

Table 2 shows how an example location can be expressed in two different ways, or formats. The first row of Table 1 illustrates latitude and longitude in decimal value format. The second row illustrates the same latitude and longitude in degree, minute, and second format. Each data format can be easily translated, or converted, into the other. Although height is relative to a plane of reference, most measurements of height in the physical world are based upon a zero surface, known as sea level. Both altitude and elevation, two synonyms for height, are usually defined as the position of a point above the mean sea level.

Some potential input parameters that may be derived from a plurality of position measurements include heading, instantaneous speed, and velocity. Heading is the direction a person or vehicle is facing or traveling, usually similar to its course. In kinematics, the instantaneous speed of an object (often denoted v) is the magnitude of its instantaneous velocity (the rate of change of its position). Instantaneous speed is thus the scalar equivalent of velocity. The average speed of an object in an interval of time is the distance traveled by the object divided by the duration of the interval. The instantaneous speed is the limit of the average speed as the duration of the time interval approaches zero. Like velocity, speed has the dimensions of a length divided by a time. The international system of units (SI) unit of speed is the meter per second (m/s), but the most usual unit of speed in everyday usage is the kilometer per hour (kph) or, in the U.S. and the U.K., miles per hour (mph). Velocity describes the rate of change of position and is a vector physical quantity; both magnitude and direction are required to define it. The scalar absolute value (magnitude) of velocity is the instantaneous speed.

Figure 5:
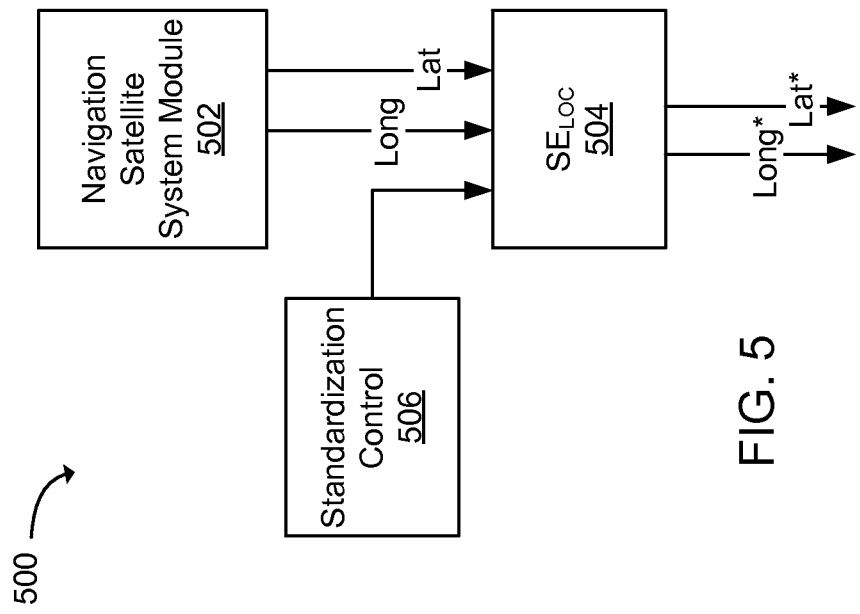
FIG. 5 is a schematic diagram illustrating standardization of location data consistent with embodiments disclosed herein.

With regard to processing location information, FIG. 5 illustrates a flow chart 500 for standardization processing for longitude (Long) and latitude (Lat) for each UE 102. A longitude and latitude are obtained from a navigation satellite system module 502, such as a GPS, GLONASS, or BDS receiver or module, and are provided as inputs into a location standardization engine 504 ($SE_{LOC}$). The standardization engine 504 standardizes the longitude (Long) and latitude (Lat) as indicated by a standardization control 506 to provide standardized location data (Long* and Lat*). The standardized location data (Long* and Lat*) may then be provided to an algorithm for calculation of an identifier. The location standardization engine 504 may be configured to convert location data between formats (e.g., from degree, minute, second to decimal or vice versa) and/or to round a latitude and longitude to a specific decimal point or drop values after a specific decimal point. In this case the standardization control 506 instructs, based on standardization instructions (or, generally speaking, based on D2D communication rules), the location standardization engine 504 to only use the first three digits after the decimal point in all received values. Other operating instructions are possible, too. Table 3 below illustrates location data for each of UE 1, UE 2, and UE 3 before and after standardization.

TABLE 3

| | Location Data Before Standardization | | Location Data After Standardization | |
|---|---|---|---|---|
| | Lat | Long | Lat* | Long* |
| UE 1 | 52.264767 N | 10.523655 E | 52.264 | 10.523 |
| UE 2 | 52.264722 N | 10.523880 E | 52.264 | 10.523 |
| UE 3 | 52° 15' 52.2822" | 10° 31' 25.8774" | 52.264 | 10.523 |

As shown in Table 3, the locations of the UEs 102 are the same after standardization. Based on Table 1 and Table 3, the standardized location data and manufacturer identification information for UE 1 and UE 3 are the same. With the same data fed into the same algorithm, UE 1 and UE 3 will have the same resulting session identifier. This allows UE 1 and UE 3 to create/join the same D2D group or cluster, to generate a common encryption key for a D2D communication, to engage in secure point-to-point communication, to use the same sub set of D2D radio resources, or the like. As one of the input parameters of UE 2, namely its manufacturer identification number, differs from UE 1 and UE 3, the session identifier calculated in UE 2 is different. UE 2 is therefore not able to access the same D2D group, generate a matching encryption key, set up a secure D2D communication link to the other two devices, use the same sub set of D2D radio resources, or the like.

In scenario 2, four UEs 102 (UE 1, UE 2, UE 3, and UE 4) independently generate session identifiers based on date and time, distance from a point of reference, and a validity period. In this scenario, a common session identifier, with limited validity, is available at the end of the calculation process in those UEs 102 or mobile devices that are residing in the same geographical region (as defined by the reference location and the UE's distance to this point of reference).

With regard to processing, the date and time parameter type is retrieved from a parent UE 102 or other mobile device clock. The point of reference, maximum distance, and validity period are read from a ticket to an event. If the ticket to the event is a paper ticket, the input parameters (i.e. the point of reference, maximum distance, and/or validity period) may be scanned/photographed by the user of the mobile device (e.g., using a camera to capture a QR code, bar code, or the like). If the ticket to the event is an electronic ticket stored in a memory of the mobile device, the input parameters can, for instance, be read directly from the electronic ticket (e.g., a portable document format (PDF) file, a hypertext markup language (HTML) file, or any other electronic file). For example, the information from the electronic ticket may be read from and fed to the trusted execution environment 208 without any user interaction or in response to permission from the user. The date and time information may need standardization due to slight differences in times and/or different date and time formats. Standardization of these parameters may include converting the date and/or time to a predetermined format and/or rounding the date or time to a desired increment. For example, the standardization rules may indicate that the date and time should be rounded to the nearest 10 minutes, 15 minutes, 30 minutes, hour, or other time interval.

With regard to location, the input parameters may include location data for a UE 102, and the standardization rules may include a point of reference and a maximum allowable distance. The standardization rules may also indicate how to determine whether the location data from the UE 102 (such as location information from a navigation satellite system receiver or module) is within the maximum distance of the point of reference. For example, a standardization engine may compute a distance between the UE 102 and the point of reference to create a UE distance. If the UE distance is less than or equal to the maximum distance, then the output of the standardization engine may be a value indicating that the UE 102 is close enough to the point of reference. For example, the standardization engine may output a "1," the term "inside," or any other defined value that will be shared by UEs 102 within the maximum distance from the point of reference. In one embodiment, a further tolerance distance greater than the maximum distance may allow a UE 102 to temporarily remain part of a D2D group if it stays within the tolerance distance and returns to within the maximum distance within a defined time period.

Figure 6:
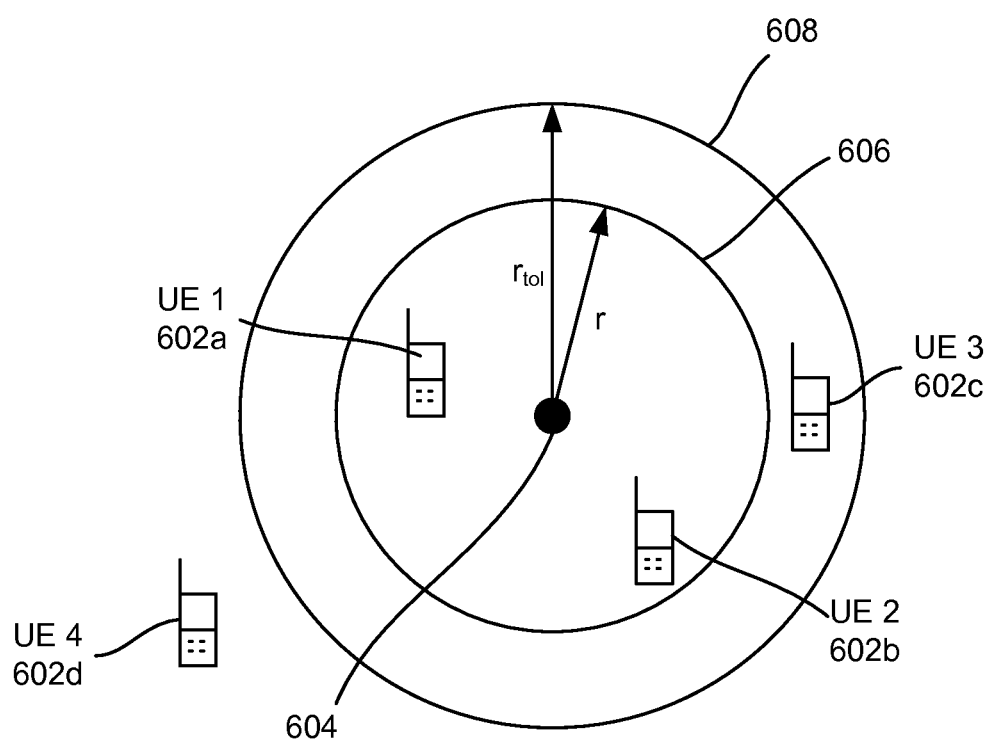
FIG. 6 is a schematic diagram illustrating UE locations with respect to a point of reference consistent with embodiments disclosed herein.

FIG. 6 and Table 4 below illustrate processing of location information based on a reference point 604. For example, a ticket may indicate the reference point 604, maximum distance (r), validity period, and/or tolerance distance ($r_{tol}$). FIG. 6 illustrates UE 1 602a, UE 2 602b, UE 3 602c, and UE 4602d in relation to the point of reference 604. A region within the maximum distance (r) is illustrated by an inner circle 606, and a region within the tolerance distance ($r_{tol}$) is illustrated by an outer circle 608. Using a standardization engine, the UEs 602a, 602b, 602c, and 602d each calculate their distance from the point of reference 604 as listed in Table 4 below. In this example, the maximum distance allowed between the point of reference 604 and a UE 602's current position, as indicated by the inner circle 606, is defined as r=30 meters. The tolerance distance within which UEs 602 may be allowed to reside for a limited time without causing their D2D session identifier to become invalid is defined as $r_{tol}$=35 meters. In this scenario, UE 1 (602a) and UE 2 (602b) are within the maximum range r and are assigned the same session identifier for the validity period. UE 3 (602c) is temporarily within the tolerance range $r_{tol}$ and is therefore assigned the same session identifier. UE 4 (602d) is residing outside both r and $r_{tol}$ and is therefore not assigned a matching session identifier.

TABLE 4

|  | Distance to Point of Reference (POR) | Comparison | Output |
|---|---|---|---|
| UE 1 | 15 meters | <r | inside |
| UE 2 | 10 meters | <r | inside |
| UE 3 | 32 meters | >r and <rtol | inside |
| UE 4 | 50 meters | >r and <rtol | outside |

FIG. 7 is a schematic flow chart diagram illustrating a method 700 for distributed D2D session setup. In one embodiment, the method 700 is performed by the UE 102 of FIG. 2.

The method 700 begins and a parameter component 202 determines 702 input parameters corresponding to the UE 102 based on D2D communication rules. The D2D communication rules may include rules provided by an MNO, an application executed on the UE 102, or a user. The communication rules may indicate parameter types and/or standardization rules for one or more parameters types. In one embodiment, the parameter component 202 determines 702 input parameters that include a first set of input parameters and a second set of input parameters. The first set includes non-standardized data that needs to be standardized, and the second set includes standardized data that does not need further standardization.

The standardization component 204 standardizes 704 any non-standardized data to create UE standardized data. In one embodiment, the standardization component 204 standardizes 704 non-standardized data based on one or more standardization rules. The standardization rules may have been provided by an application, MNO, user, ticket, or the like. In one embodiment, the standardization rules may be retrieved via a web link or other locator provided by an application, MNO, user, ticket, or the like. In one embodiment, the standardization component 204 standardizes 704 any non-standardized data within the trusted execution environment 208.

The identifier component 206 generates 706 a session identifier using the input parameters as input for a predefined algorithm. Specifically, the input parameters may include pre-standardized data (i.e., data in a standardized form before D2D session setup) and UE standardized data (i.e., data that was standardized by the standardization component 204). The algorithm may generate the identifier such that identical inputs result in identical outputs, regardless of the UE 102 or machine on which the algorithm is implemented. In one embodiment, the identifier component 206 generates 706 a session identifier using a random number generator, cryptographic hash function, or other algorithm. In one embodiment, the identifier component 206 generates 706 a session identifier within the trusted execution environment 208.

The D2D session component 210 causes the UE 102 to communicate 708 in a D2D group or cluster corresponding to the session identifier. For example, the D2D session component 210 may cause the UE 102 to communicate 708 in a D2D group by establishing or joining a D2D group that uses the session identifier as, or to generate, one or more of a group ID, an encryption, a resource allocation, or the like.

FIG. 8 is a schematic flow chart diagram illustrating another method 800 for distributed D2D session setup. In one embodiment, the method 800 is performed by the UE 102 of FIG. 2.

The method 800 begins and the parameter component 202 determines 802 parameter types for controlling D2D discovery. The parameter types may include data such as location data, audio data from a local environment, an image, identifiers for software, identifiers for hardware, identifiers for events, or any other type of data that may be obtained by or included with a UE 102. The parameter types may be used to define a group of UEs 102 that are authorized to communicate with each other.

The parameter component 202 provides 804 input parameters corresponding to the determined parameter types to the trusted execution environment 208. The trusted execution environment 208 may include a smart card, a TPM, or any other secure execution environment. In one embodiment, the parameter component 202 provides 804 the input parameters to an integrated trusted execution environment 208. In one embodiment, the parameter component 202 provides 804 the input parameters to a trusted execution environment 208 that is selectively removable from the UE 102.

The D2D session component 210 receives 806, from the trusted execution environment 208, identification information derived from the input parameters. The identification information may include an identifier, a code, a key, or other information that uniquely identifies UE 102 based on the input parameters.

Figure 9:
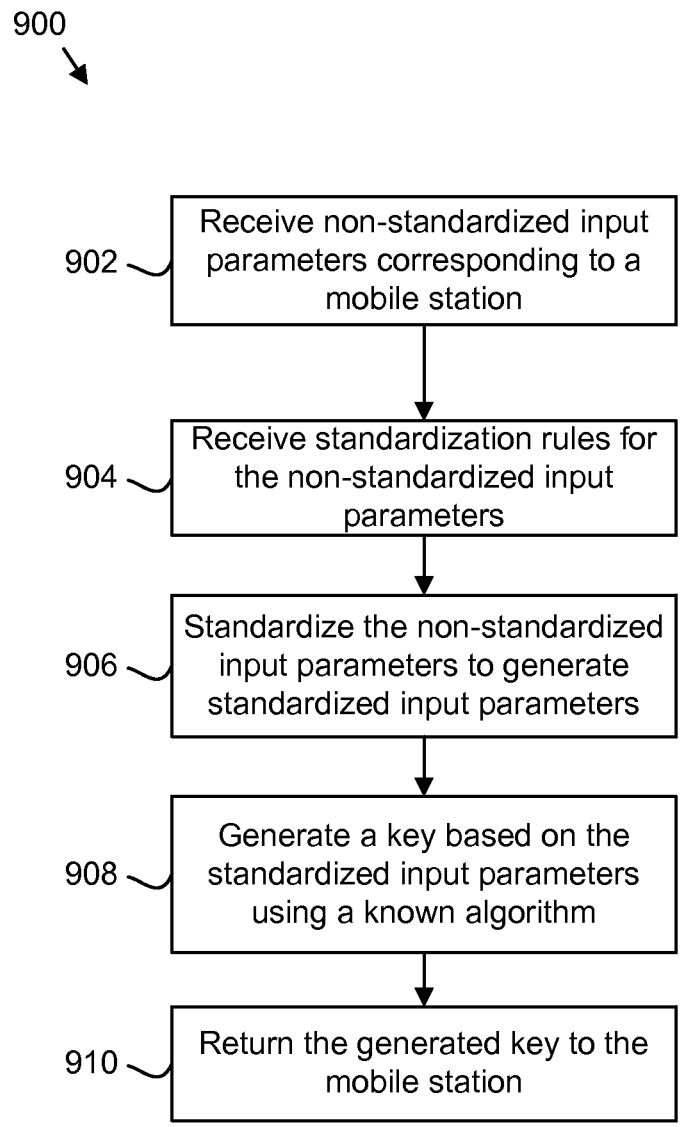
FIG. 9 is a schematic flow chart diagram illustrating a method for generating identification information consistent with embodiments disclosed herein.

The D2D session component 210 establishes 808 a D2D session with in-range wireless communication devices having matching identification information. In one embodiment, the D2D session component 210 establishes the D2D session with communication devices that have the same group ID, encryption key, resource allocation, or the like FIG. 9 is a schematic flow chart diagram illustrating a method 900 for generating a session identifier. In one embodiment, the method 900 is performed in the trusted execution environment 208 of FIG. 2 and/or FIG. 3.

The method 900 begins and the trusted execution environment 208 receives 902 non-standardized input parameters corresponding to a mobile station. The trusted execution environment 208 also receives 904 standardization rules for the non-standardized input parameters. In one embodiment, the standardization rules may include rules defined by a user, MNO, application, or other entity or component. In one embodiment, the standardization rules may be linked with input parameters having specific types. In one embodiment, standardization rules each indicate a specific input parameter or parameter type to which the rule should be applied.

A standardization component 204 within the trusted execution environment 208 standardizes 906 the non-standardized input parameters to generate standardized input parameters. The standardization component 204 standardizes 906 the input parameters based on the standardization rules to create standardized data.

An identifier component 206 within the trusted execution environment 208 generates 908 a key based on the standardized input parameters using a known algorithm. The known algorithm may include an algorithm known at least to one more other trusted execution environments on other mobile stations. For example, the other mobile stations may be able to execute the same algorithm to get the same key if they have the same input parameters.

The trusted execution environment 208 returns 910 the generated key to the mobile station. The trusted execution environment 208 may be removably coupled with the mobile station via a slot or port, and the key may be provided to the mobile station via the slot or port. In one embodiment, the trusted execution environment 208 is integrated with the mobile stations, and the trusted execution environment 208 returns 910 the generated key to a D2D session component or other component of the mobile station.

Figure 10:
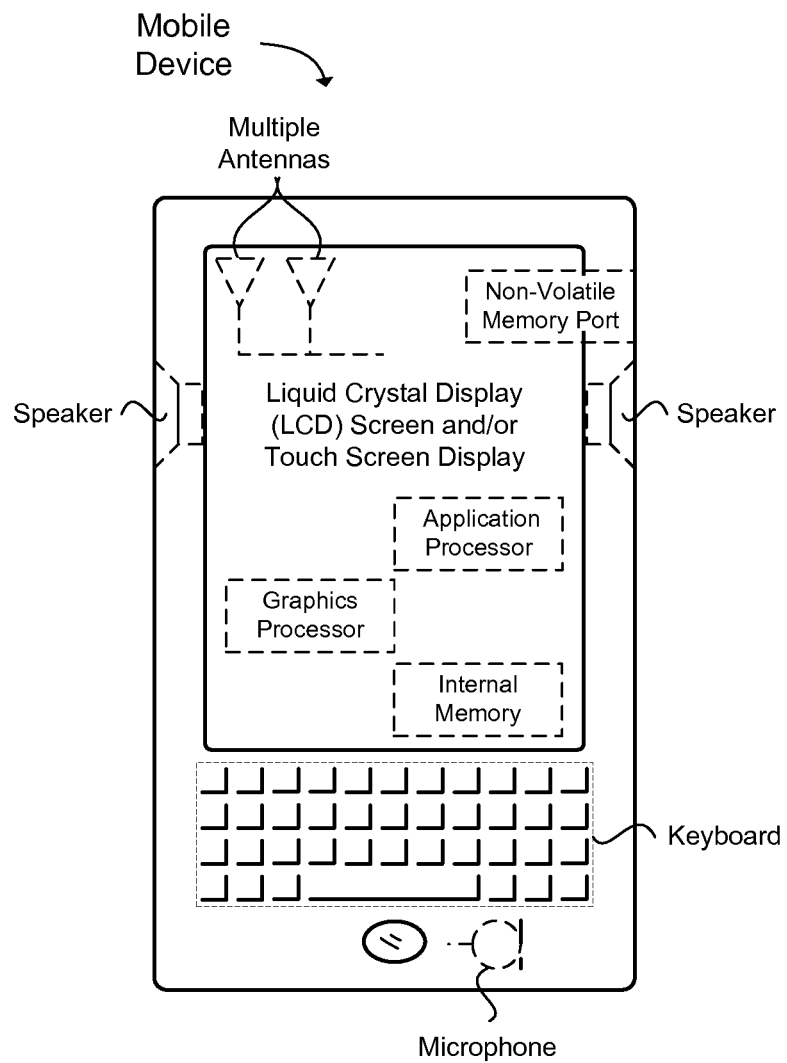
FIG. 10 is a schematic diagram of a mobile device consistent with embodiments disclosed herein.

FIG. 10 is an example illustration of a mobile device, such as a user equipment (UE), a mobile station (MS), a mobile wireless device, a mobile communication device, a tablet, a handset, or another type of wireless communication device. The mobile device can include one or more antennas configured to communicate with a transmission station, such as a base station (BS), an eNB, a base band unit (BBU), a remote radio head (RRH), a remote radio equipment (RRE), a relay station (RS), a radio equipment (RE), or another type of wireless wide area network (WWAN) access point. The mobile device can be configured to communicate using at least one wireless communication standard, including 3GPP LTE, WiMAX, high speed packet access (HSPA), Bluetooth, and Wi-Fi. The mobile device can communicate using separate antennas for each wireless communication standard or shared antennas for multiple wireless communication standards. The mobile device can communicate in a wireless local area network (WLAN), a wireless personal area network (WPAN), and/or a WWAN.

FIG. 10 also provides an illustration of a microphone and one or more speakers that can be used for audio input and output from the mobile device. The display screen may be a liquid crystal display (LCD) screen or other type of display screen, such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

EXAMPLES

The following examples pertain to further embodiments:

Example 1 is a UE configured to communicate with an E-UTRAN. The UE includes a parameter component, a standardization component, an identifier component, and a D2D session component. The parameter component is configured to determine input parameters corresponding to the UE or a user of the UE based on one or more D2D communication rules. The input parameters include a first set of input parameters comprising non-standardized data and a second set of input parameters comprising pre-standardized data. The standardization component is configured to standardize the non-standardized data of the first set of input parameters to create UE standardized data. The identifier component is configured to generate a session identifier using the UE standardized data and the pre-standardized data as inputs in a predefined algorithm. The D2D session component is configured to cause the UE to communicate in a D2D cluster corresponding to the session identifier.

In Example 2, the UE of Example 1 optionally includes one or more of a standardization component that is configured to standardize the non-standardized data in a trusted execution environment and an identifier component that is configured to generate the D2D session identifier in the trusted execution environment.

In Example 3, the D2D session component of any of Examples 1-2 are optionally configured to generate a D2D group identifier using the session identifier and to join a D2D group corresponding to the D2D group identifier.

In Example 4, the D2D session component of any of Examples 1-3 is optionally configured to generate an encryption key using the D2D session identifier, wherein communicating in the D2D cluster comprises sending signals encrypted using the encryption key.

In Example 5, the D2D session component of any of Examples 1-4 is optionally configured to allocate resources based on the session identifier.

In Example 6, the D2D session component of any of Examples 1-5 is optionally configured to allocate resources by establishing a frequency hopping sequence based on the session identifier.

In Example 7, the parameter component of any of Examples 1-6 is optionally configured to receive the communication rules defined by one or more of a user, an application layer program executed by the UE, and an MNO.

In Example 8, the parameter component of any of Examples 1-7 is optionally configured to receive communication rules indicating a validity period and the D2D session component is configured to block communication in the D2D cluster outside the validity period.

Example 9 is a method for device-to-device (D2D) session setup. The method includes determining, at a parent wireless communication device configured to communicate with an eNodeB, parameter types for controlling D2D discovery. The method includes providing, to a trusted execution environment, input parameters corresponding to the determined parameter types. The method includes receiving, from the trusted execution environment, identification information derived from the input parameters. The method includes establishing a D2D session between one or more in-range wireless communication devices having matching identification information.

In Example 10, the method of Example 9 optionally further includes receiving one or more standardization rules for standardizing at least a portion of the input parameters from one or more of an application layer program executed by the wireless communication device and a MNO. The method optionally further includes providing the one or more data standardization rules to the trusted execution environment.

In Example 11, the method of any of Examples 9-10 optionally further includes obtaining a least a portion of the input parameters from a sensor of the wireless communication device.

In Example 12, the sensor of any of Examples 9-11 optionally includes a microphone and the input parameters include audio data gathered by the microphone.

In Example 13, the sensor of any of Examples 9-12 optionally includes a camera and the input parameters include information from a barcode captured by the camera.

In Example 14, the sensor of any of Examples 9-13 optionally includes a navigation satellite system receiver and the input parameters include location information determined by the navigation satellite system receiver.

In Example 15, the input parameters of any of Examples 9-14 can optionally include one or more of a date, a time, a location, audio data, optical data, velocity data, and acceleration information.

In Example 16, the input parameters of any of Examples 9-15 can optionally include one or more of a service provider identifier, a device manufacturer identifier, an event organizer identifier, a software developer identifier, an application identifier, and ticket information.

Example 17 is an integrated circuit configured to perform operations in a trusted execution environment. The integrated circuit is configured to receive input parameters in a first format corresponding to a mobile station configured to communicate using a 3GPP communication standard. The integrated circuit is configured to receive format rules for the input parameters in the first format. The integrated circuit is configured to standardize the input parameters in the first format to convert the input parameters to a second format. The integrated circuit is configured to generate a key based on the standardized input parameters using a known algorithm configured to generate a same identifier when input parameters are the same. The known algorithm is known to a plurality of other integrated circuit modules. The integrated circuit is configured to return the generated key to the mobile station.

In Example 18, the integrated circuit of Example 17 optionally includes one or more of a smart card and a TPM.

In Example 19, the integrated circuit of any of Examples 17-18 optionally includes a smart card and the smart card comprises one or more of a SIM card and a UICC.

In Example 20, the input parameters of any of Examples 17-19 include a first set, the integrated circuit is optionally further configured to retrieve a second set comprising input parameters in the second format from secure memory, wherein integrated circuit generates the key by generating the key based on the second set.

In Example 21, the integrated circuit of any of Examples 17-20 are optionally removably coupled with the mobile station.

In Example 22, the integrated circuit of any of Examples 17-21 are optionally integrated as part of the mobile station.

Example 23 is a method for D2D communication. The method includes determining input parameters corresponding to the UE or a user of the UE based on one or more D2D communication rules. The input parameters include a first set of input parameters comprising non-standardized data and a second set of input parameters comprising pre-standardized data. The method includes standardizing the non-standardized data of the first set of input parameters to create UE standardized data. The method includes generating a session identifier using the UE standardized data and the pre-standardized data as inputs in a predefined algorithm. The method includes communicating in a D2D cluster corresponding to the session identifier.

In Example 24, the method of Example 23 optionally includes one or more of standardizing the non-standardized data in a trusted execution environment and generating the D2D session identifier in the trusted execution environment.

In Example 25, the method of any of Examples 23-24 optionally includes generating a D2D group identifier using the session identifier and joining a D2D group corresponding to the D2D group identifier.

In Example 26, the method of any of Examples 23-25 optionally includes generating an encryption key using the D2D session identifier, wherein communicating in the D2D cluster comprises sending signals encrypted using the encryption key.

In Example 27, the method of any of Examples 23-26 optionally includes allocating resources based on the session identifier.

In Example 28, the method of any of Examples 23-27 optionally includes allocating resources by establishing a frequency hopping sequence based on the session identifier In Example 29, the method of any of Examples 23-28 optionally includes receiving the communication rules defined by one or more of a user, an application layer program executed by the UE, and a MNO.

In Example 30, the method of any of Examples 23-29 optionally includes receiving communication rules indicating a validity period and blocking communication in the D2D cluster outside the validity period.

Example 31 is a method for D2D session setup. The method includes determining, at a parent wireless communication device configured to communicate with an eNodeB, parameter types for controlling D2D discovery. The method includes providing, to a trusted execution environment, input parameters corresponding to the determined parameter types. The method includes receiving, from the trusted execution environment, identification information derived from the input parameters. The method includes establishing a D2D session between one or more in-range wireless communication devices having matching identification information.

In Example 32, the method of any of Examples 23-31 optionally further includes receiving one or more standardization rules for standardizing at least a portion of the input parameters from one or more of an application layer program executed by the wireless communication device and a MNO. The method optionally further includes providing the one or more data standardization rules to the trusted execution environment.

In Example 33, the method of any of Examples 23-32 optionally further includes obtaining a least a portion of the input parameters from a sensor of the wireless communication device.

In Example 34, the sensor of any of Examples 23-33 optionally includes a microphone and the input parameters include audio data gathered by the microphone.

In Example 35, the sensor of any of Examples 23-34 optionally includes a camera and the input parameters include information from a barcode captured by the camera.

In Example 36, the sensor of any of Examples 23-35 optionally includes a navigation satellite system receiver and the input parameters include location information determined by the navigation satellite system receiver.

In Example 37, the input parameters of any of Examples 23-36 can optionally include one or more of a date, a time, a location, audio data, optical data, velocity data, and acceleration information.

In Example 38, the input parameters of any of Examples 23-37 can optionally include one or more of a service provider identifier, a device manufacturer identifier, an event organizer identifier, a software developer identifier, an application identifier, and ticket information.

Example 39 is a method. The method includes receiving input parameters in a first format corresponding to a mobile station configured to communicate using a 3GPP communication standard. The method includes receiving format rules for the input parameters in the first format. The method includes standardizing the input parameters in the first format to convert the input parameters to a second format. The method includes generating a key based on the standardized input parameters using a known algorithm configured to generate a same identifier when input parameters are the same, wherein the known algorithm is known to a plurality of other integrated circuit modules. The method includes returning the generated key to the mobile station.

In Example 40, the method of Example 39 is optionally performed in a trusted execution environment.

In Example 41, the trusted execution environment of any of Examples 39-40 optionally includes one or more of a SIM card and a UICC.

In Example 42, the trusted execution environment of any of Examples 39-41 optionally includes a trusted platform module (TPM).

In Example 43, the input parameters of any of Examples 39-42 include a first set and the method further optionally includes retrieving a second set comprising input parameters in the second format from secure memory. Generating the key further comprises generating the key based on the second set.

In Example 44, the method of any of Examples 39-43 is optionally performed in an integrated circuit that is either removably coupled with the mobile station or integrated as part of the mobile station.

Example 45 is an apparatus comprising means to perform a method of any of Examples 23-44.

Example 46 is a machine readable storage including machine-readable instructions, when executed, to implement a method or realize an apparatus of any of Examples 23-45.

Various techniques, or certain aspects or portions thereof, may take the form of program code (i.e., instructions) embodied in tangible media, such as floppy diskettes, CD-ROMs, hard drives, a non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment of the present invention. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present invention may be referred to herein along with alternatives for the various components thereof. It is understood that such embodiments, examples, and alternatives are not to be construed as de facto equivalents of one another, but are to be considered as separate and autonomous representations of the present invention.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the invention is not to be limited to the details given herein, but may be modified within the scope and equivalents of the appended claims.

Those having skill in the art will appreciate that many changes may be made to the details of the above-described embodiments without departing from the underlying principles of the invention. The scope of the present invention should, therefore, be determined only by the following claims.

The invention claimed is:

1. User equipment (UE) configured to communicate with an evolved universal terrestrial radio access network (E-UTRAN), the UE comprising:
   one or more processors configured to:
      determine input parameters corresponding to the UE or a user of the UE based on one or more device-to-device (D2D) communication rules, the input parameters comprising a first set of input parameters comprising non-standardized data and a second set of input parameters comprising pre-standardized data;
      standardize the non-standardized data of the first set of input parameters to create UE standardized data, and to standardize the non-standardized data in a trusted execution environment;
      generate a session identifier using the UE standardized data and the pre-standardized data as inputs in a predefined algorithm, and to generate the D2D session identifier in the trusted execution environment; and
      cause the UE to communicate in a D2D cluster corresponding to the session identifier.

2. The UE of claim 1, wherein the one or more processors are further configured to generate a D2D group identifier using the session identifier and to join a D2D group corresponding to the D2D group identifier.

3. The UE of claim 1, wherein the one or more processors are further configured to generate an encryption key using the D2D session identifier, wherein communicating in the D2D cluster comprises sending signals encrypted using the encryption key.

4. The UE of claim 1, wherein the one or more processors are further configured to allocate resources based on the session identifier.

5. The UE of claim 4, wherein the one or more processors are further configured to allocate the resources by establishing a frequency hopping sequence based on the session identifier.

6. The UE of claim 1, wherein the one or more processors are further configured to receive the communication rules defined by one or more of a user, an application layer program executed by the UE, and a mobile network operator (MNO).

7. The UE of claim 1, wherein the one or more processors are further configured to receive communication rules indicating a validity period, and to block communication in the D2D cluster outside the validity period.

8. User equipment (UE) configured to communicate with an evolved universal terrestrial radio access network (E-UTRAN), the UE comprising:
   logic, at least a portion of which comprises circuitry, to:
      determine input parameters corresponding to the UE or a user of the UE based on one or more device-to-device (D2D) communication rules, the input parameters comprising a first set of input parameters comprising non-standardized data and a second set of input parameters comprising pre-standardized data;
      standardize the non-standardized data of the first set of input parameters to create UE standardized data;
      generate a session identifier using the UE standardized data and the pre-standardized data as inputs in a predefined algorithm;
      cause the UE to communicate in a D2D cluster corresponding to the session identifier;

generate a D2D group identifier using the session identifier; and join a D2D group corresponding to the D2D group identifier.

9. The UE of claim 8, wherein the logic is further configured to allocate resources based on the session identifier.

10. The UE of claim 9, wherein the logic is further configured to allocate the resources by establishing a frequency hopping sequence based on the session identifier.

11. The UE of claim 8, wherein the logic is further configured to receive the communication rules defined by one or more of a user, an application layer program executed by the UE, and a mobile network operator (MNO).

12. User equipment (UE) configured to communicate with an evolved universal terrestrial radio access network (E-UTRAN), the UE comprising:
one or more processor; and
a non-transitory computer readable storage medium comprising instructions for execution by the one or more processor to:
determine input parameters corresponding to the UE or a user of the UE based on one or more device-to-device (D2D) communication rules, the input parameters comprising a first set of input parameters comprising non-standardized data and a second set of input parameters comprising pre-standardized data;
standardize the non-standardized data of the first set of input parameters to create UE standardized data;
generate a session identifier using the UE standardized data and the pre-standardized data as inputs in a predefined algorithm;
cause the UE to communicate in a D2D cluster corresponding to the session identifier; and
generate an encryption key using the D2D session identifier, wherein to communicate in the D2D cluster comprises to send signals encrypted using the encryption key.

13. The UE of claim 12, wherein the instructions, when executed by the one or more processor, are further to allocate resources based on the session identifier.

14. The UE of claim 13, wherein the instructions, when executed by the one or more processor, are further to allocate the resources by establishing a frequency hopping sequence based on the session identifier.

15. The UE of claim 12, wherein the instructions, when executed by the one or more processor, are further to configured to receive the communication rules defined by one or more of a user, an application layer program executed by the UE, and a mobile network operator (MNO).

16. User equipment (UE) configured to communicate with an evolved universal terrestrial radio access network (E-UTRAN), the UE comprising:
one or more processors to:
determine input parameters corresponding to the UE or a user of the UE based on one or more device-to-device (D2D) communication rules, the input parameters comprising a first set of input parameters comprising non-standardized data and a second set of input parameters comprising pre-standardized data;
standardize the non-standardized data of the first set of input parameters to create UE standardized data;
generate a session identifier using the UE standardized data and the pre-standardized data as inputs in a predefined algorithm;
allocate resources based on the session identifier, wherein the allocation is by establishing a frequency hopping sequence based on the session identifier; and
cause the UE to communicate in a D2D cluster corresponding to the session identifier.

17. The UE of claim 16, wherein the one or more processors are further configured to receive the communication rules defined by one or more of a user, an application layer program executed by the UE, and a mobile network operator (MNO).

18. The UE of claim 16, wherein the one or more processors are further configured to receive communication rules indicating a validity period, and to block communication in the D2D cluster outside the validity period.

19. User equipment (UE) configured to communicate with an evolved universal terrestrial radio access network (E-UTRAN), the UE comprising:
logic, at least a portion of which comprises circuitry, to:
determine input parameters corresponding to the UE or a user of the UE based on one or more device-to-device (D2D) communication rules, wherein the communication rules indicate a validity period, the input parameters comprising a first set of input parameters comprising non-standardized data and a second set of input parameters comprising pre-standardized data;
standardize the non-standardized data of the first set of input parameters to create UE standardized data;
generate a session identifier using the UE standardized data and the pre-standardized data as inputs in a predefined algorithm; and
cause the UE to communicate in a D2D cluster corresponding to the session identifier, and to block communication in the D2D cluster outside the validity period.

20. The UE of claim 19, wherein the logic is further configured to:
standardize the non-standardized data in a trusted execution environment; and
generate the D2D session identifier in the trusted execution environment.

21. The UE of claim 19, wherein the logic is further configured to generate a D2D group identifier using the session identifier and to join a D2D group corresponding to the D2D group identifier.

22. The UE of claim 19, wherein the logic is further configured to generate an encryption key using the D2D session identifier, wherein communicating in the D2D cluster comprises sending signals encrypted using the encryption key.

* * * * *